July 16, 1940.  H. J. KEMP  2,207,924
TILTING SEED GRAIN DUSTING MACHINE
Filed Oct. 7, 1937  4 Sheets-Sheet 1

INVENTOR
H. J. KEMP
BY Fetherstonhaugh & Co.
ATTYS.

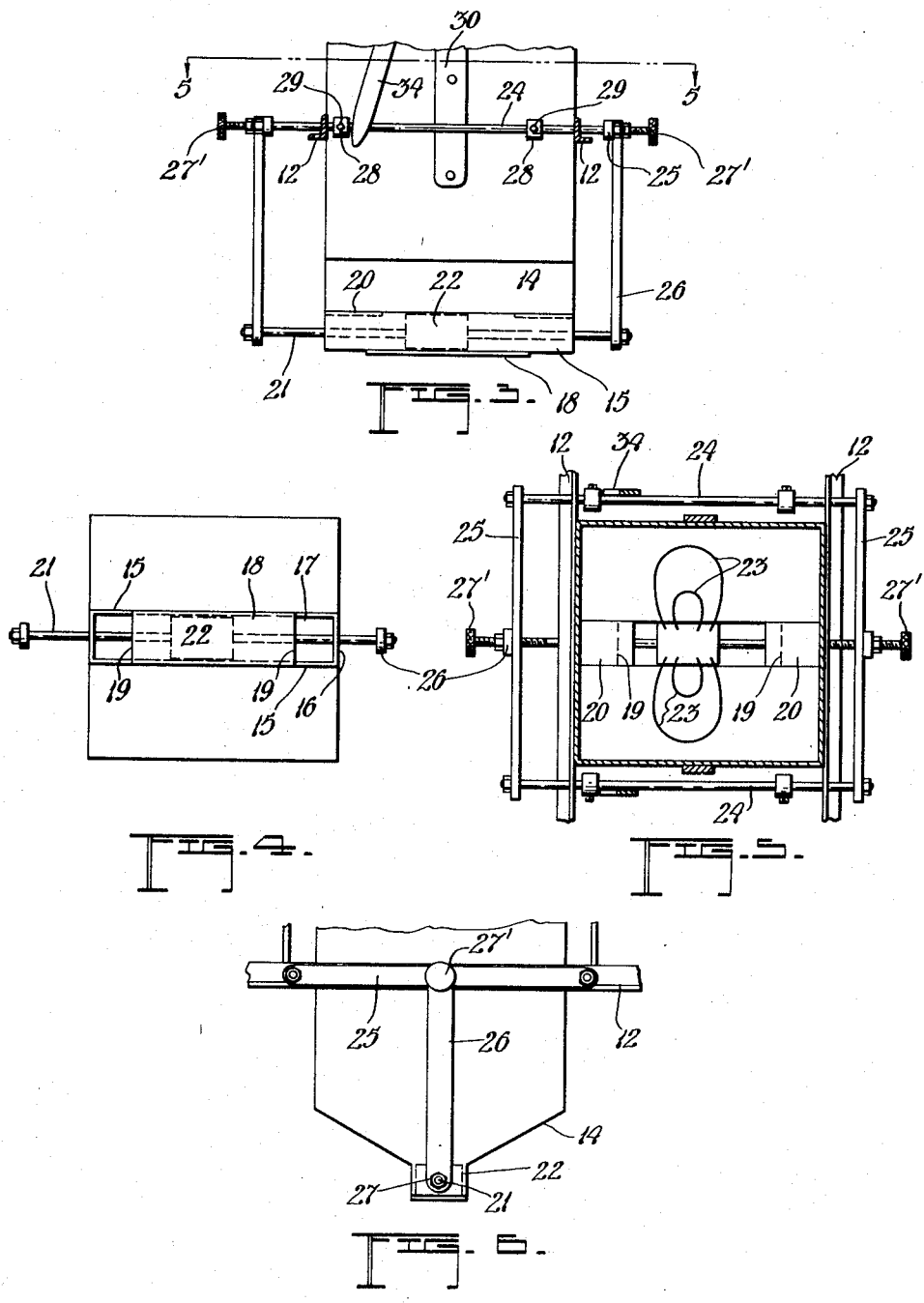

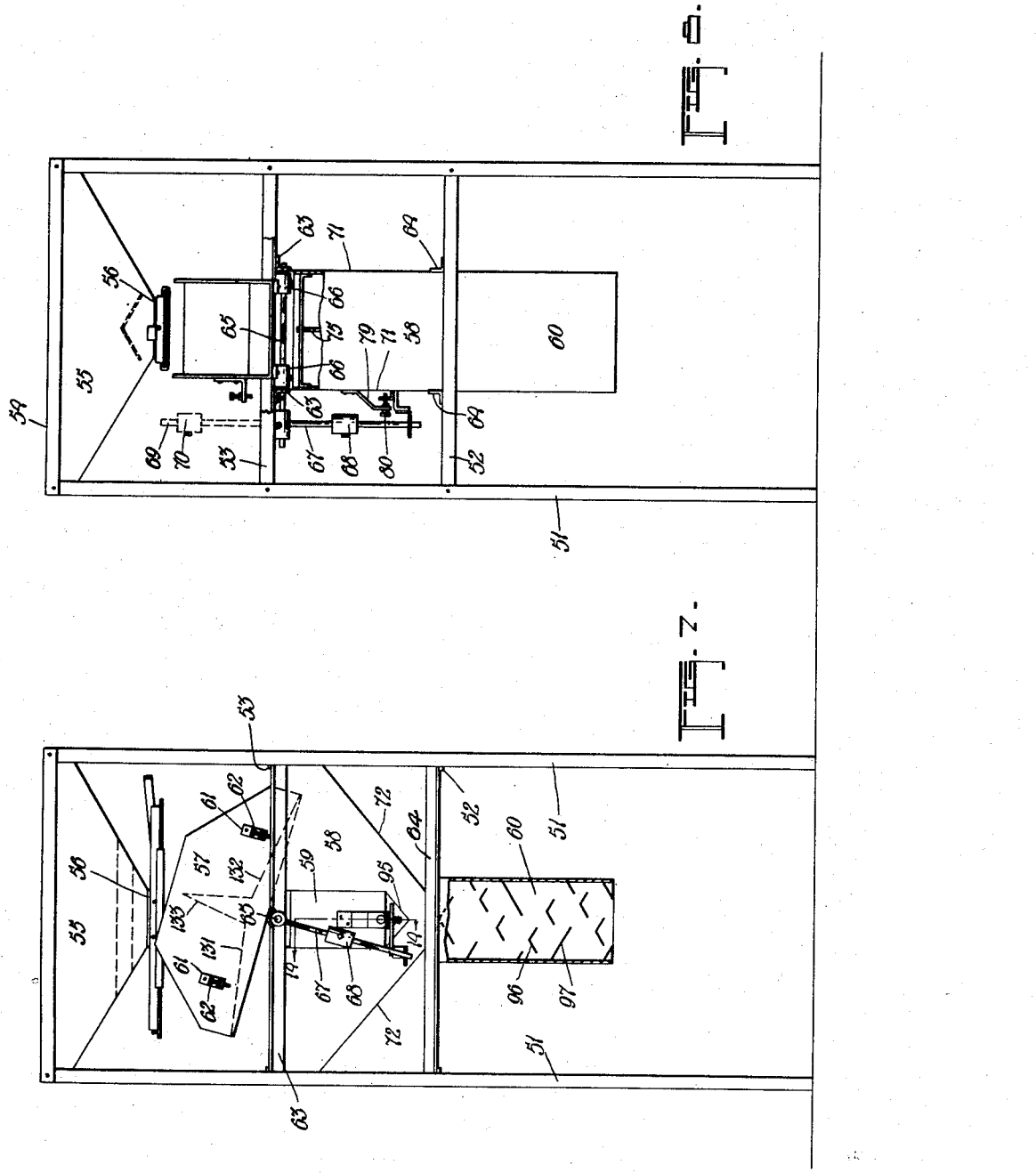

July 16, 1940.   H. J. KEMP   2,207,924
TILTING SEED GRAIN DUSTING MACHINE
Filed Oct. 7, 1937   4 Sheets-Sheet 4

INVENTOR
H. J. KEMP
BY Fetherstonhaugh & Co.
ATTYS.

Patented July 16, 1940

2,207,924

UNITED STATES PATENT OFFICE 2,207,924

TILTING SEED GRAIN DUSTING MACHINE

Harold J. Kemp, Swift Current, Saskatchewan, Canada, assignor to Western Steel Products Limited, St. Boniface, Manitoba, Canada Application October 7, 1937, Serial No. 167,844
In Canada January 11, 1937

2 Claims. (Cl. 83—28)

This invention relates to improvements in tilting seed grain dusting machines, and an object of the invention is to provide a device of the character herein described which is entirely automatic in action, being actuated by the weight of the grain passing therethrough.

A further object of the invention is to provide a device of the character herein described which is equipped with means for automatically measuring successive quantities of seed grain and chemical dust, and further means to mix the same intimately before discharge from the device.

A further object of the invention is to provide a device of the character herein described which is equipped with a rocking pan for measuring the grain, the movement of this pan being utilized to actuate a dust dispensing mechanism which discharges the correct quantity of chemical dust to treat the grain issuing from the pan in each tilting movement.

A further object of the invention is to provide a device of the character herein described which is provided with means for varying the quantity of grain discharged from the pan in each rocking movement and with further means for independently adjusting the dust discharge from the dust dispenser.

A further object of the invention is to provide a device of the character herein described in which agitators are used in the dust box to prevent bridging of the dust therein.

A further object of the invention is to provide a device of the character herein described in which a plurality of baffles are used to insure thorough mixing of the grain and chemical dust.

A further object of the invention is to provide a device of the character herein described in which the chemical dust is discharged from the dispenser and deposited upon one of the baffle plates immediately prior to the grain spill from the rocking pan, the dust being thoroughly scattered throughout the grain when struck thereby.

A further object of the invention is to provide a device of the character herein described in which the rocking pan is equipped with a counter weight which permits the use of the same pan with grains possessing different specific gravities.

A further object is to provide a device of the character herein described in which the arc of travel in the metering pan and the adjustment of the dust dispensing mechanism may be governed by means of a simple twin adjustment.

A further object of my invention is to provide a device of the character herein described which includes an improved removable dust container of the "wiper" type to facilitate inspection, cleaning and adjustment, one thumb screw controlling the dust feed.

A still further object of my invention is to provide a device of the character herewithin described in which the flow of grain through the dusting apparatus may be started and checked instantaneously.

A still further object of the invention is to provide a device of the character herein described which is light in weight, simple in construction and cannot easily become out of order.

With the above more important objects in view and such other minor objects as may appear as the specification proceeds, my invention consists essentially in the arrangement and construction of parts all as hereinafter more particularly described, reference being had to the accompanying drawings, in which:

Fig. 3 is an elevational detail view of the lower portion of the dust dispenser.

Fig. 4 is a view of the under side of the dust dispenser.

Fig. 5 illustrates a sectional view taken on the line 5—5 Figure 3.

Fig. 6 is a further detail view showing the end of the dust dispenser and associated mechanism.

Fig. 7 illustrates a side elevational view of an alternative embodiment of my seed grain dusting machine.

Fig. 8 is a central sectional elevation of Figure 7.

In the drawings like characters of reference indicate corresponding parts in the different figures.

Figure 2:
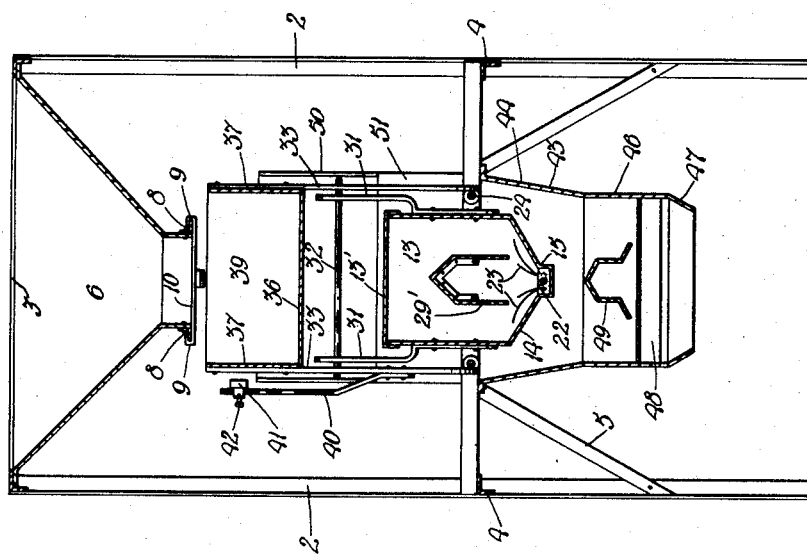
Fig. 2 is a central sectional elevation of the same.

This invention consists of a framework 1 which is substantially square and is composed of four corner members or legs 2, held in position by four upper cross members 3 and further cross members 4 located intermedially along the length of the legs. Suitable braces 5 are provided to add rigidity to the structure.

Secured to the cross members 3 is a square grain hopper 6 which converges downwardly and centrally into a short outlet tube 7 which also possesses a square configuration. Guide bars 8, having outwardly extending flanges 9 are secured along two sides of this tube and upon these bars is slidably mounted a pair of opposed gates 10, the ends of which are turned as at 11 to form handles for actuating the same.

With this double gate arrangement, it is possible to control, the flow of grain from the hopper, while at the same time having the grain issue from an opening which is centrally disposed with relation to the hopper, a necessary expedient. the reason for which will presently be explained.

Extending transversely between two of the cross bars 4, is a pair of parallel angle irons 12 which carry a centrally positioned dust box or dispenser 13. This dispenser has a substantially square configuration and is provided with a removable cover 13'. The lower walls 14 of the two opposing sides of the box converge downwardly as is illustrated most clearly in Figures 2 and 6. Narrow, vertically disposed flanges 15 extend along the edges of the walls and are connected at either end by short plates 16 to form a longitudinally extending channelway 17. To the lower edges of the flanges 15 is secured a narrow plate 18, the ends 19 of which are spaced from the plates 16 as is illustrated in Figure 4 of the drawings accompanying this application.

The upper edges of the flanges 15 within the dust dispenser are provided with a pair of identical cover plates 20 which are secured at either end of the channelway 17 and are of sufficient length to overlap the edges of the plate 18 a short distance.

Extending longitudinally and centrally through the channelway 17 is a slidable rod 21, to the centre of which is firmly secured a rectangular block 22. This block is designed to fit snugly within the channelway 17 and to slide therein under movement of the rod 21. Embedded within the block and extending upwardly and laterally therefrom, are a plurality of stiff arcuate wires 23 which are designed to act as agitators to prevent bridging of the dust within the dispenser. The wires forming these agitators may, if desired, be crimped, although this is not essential.

Slidably mounted within the vertically disposed flanges of the angle irons 12 and situated on either side of the dust dispenser 13 is a pair of reciprocating rods 24, to the ends of which are secured connecting strips 25. Affixed to the central portion of each of the connecting strips is a downwardly depending arm 26, the lower end of each of which is attached to the rod 21 by nuts 27. Extending through the apex of the arm 26 and the member 25 is a set screw 27' which may be adjusted to vary the movement between the end thereof and the angle 12 with which it comes in contact in the reciprocating movement later to be described.

It should be mentioned that each of the reciprocating rods 24 is provided with a pair of collars 28 between the angle irons 12, these collars being positioned upon the member 24 by setscrews 29 and so situated that they will limit the sweep of a pendulum which will also be described later.

Extending parallel to the channelway 17, between the inner walls of the dispensing box is a removable baffle 29' designed to prevent packing of the dust.

Considering the dust dispensing mechanism 10 just described, it will be apparent that if the bars 24 are shifted endwise, they will induce similar movement in the central rod 21, thereby shifting the block 22, while the length of the backward and forward stroke of this block will be dependent upon the position of the set-screws 27'. The collars, it should be noted, are each provided with set screws 29, so that the positions thereof may be changed upon the reciprocating rods.

Figure 1:
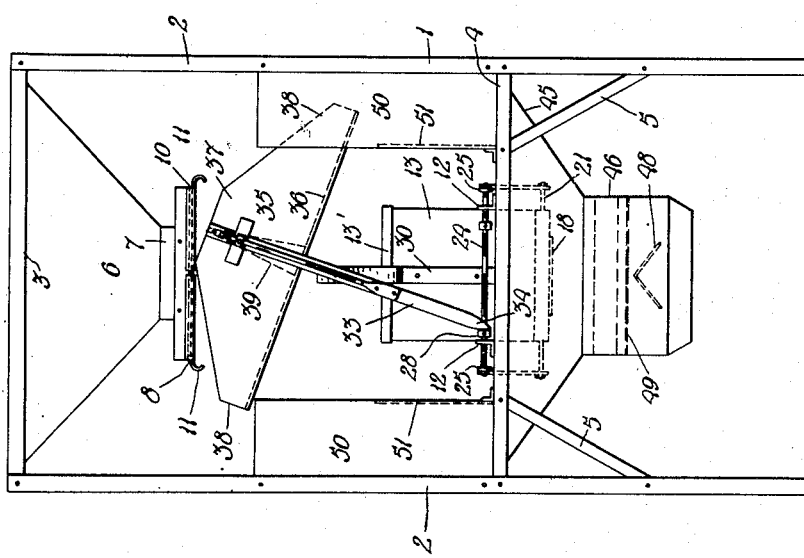
Fig. 1 illustrates a side elevational view of my improved type of grain dusting machine.

Secured to the opposite side of the dust box is a pair of standards 30, the upper ends 31 of which are off-set to permit the box cover 13' to be placed thereon. Through the upper ends of the standards 31 extends a rotatable and removable shaft 32, the ends of which are designed to receive a pair of swing bars 33. The lower ends 34 of these bars, are pointed and are designed to engage with the collars 28 in the manner shown most clearly in Figure 1 of the accompanying drawings.

Upon the upper ends of the swing bars, above the standards 31, is secured a rocking pan 35 which consists of a floor plate 36 and a pair of side walls 37 to which the swing bars are attached, these walls having a maximum height for a distance on either side of the centre thereof, and tapered to a minimum at the outer edges 38.

A downwardly diverging partition 39 is centrally positioned between the walls 37, the upper edge thereof lying flush with the upper edges of the walls. Fastened to one of the swing bars 33 is an angulated rod 40 upon which is slidably mounted a counterweight 41 equipped with a set screw 42 in the manner illustrated.

Situated beneath the side bars 4, is a discharge hopper 43 consisting of two pairs of downwardly converging walls 44 and 45. The walls 45 extend outwardly to the sides of the framework, and are secured at their edges beneath the braces 4. The intervening walls 44, however, are more steeply sloped and the upper edges thereof terminate adjacent either side of the dust dispenser 13. A wide spout 46 is attached to the lower end of the hopper 43 and the mouth thereof is provided with a converging flange 47.

Extending transversely between the inner walls of the spout 46 are a plurality of baffles 48, the upper baffle 49 running parallel to the channelway 17, and being obtusely angulated in order that dust discharged from the dispenser may remain thereon until scattered by grain in a manner presently to be explained.

It should be mentioned that in the drawings accompanying this application, only two baffles are illustrated. Applicant, however, does not wish to be limited to this number of baffles, as it is apparent that any number thereof may be used without departing from the spirit of the invention.

Mounted upon opposite sides of the dust dispenser are a pair of conducting chutes 50 which are substantially rectangular in configuration and open into the discharge hopper 43. The opposing walls 51 of the chutes, terminate some distance from the upper edges thereof in order that the ends 38 of the pan 35 may protrude into the chute during the grain discharging process.

The construction of the device having been explained, the mode of operation thereof will now be presented.

The chemical dust to be used is first placed within the dispenser box 13 and grain to be treated is shovelled into the hopper 6. Both gates 10 are then pulled outwardly an equal distance, so that the grain will pass outwardly through the centre of the tube 7. The seed will now commence to fill one side of the rocking pan 35 and when it is filled, the pan will tilt over and discharge the contents thereof into one of the conducting chutes 50. As the pan tilts, however, the bars 33 will swing over and strike a pair of the collars 28, thus shifting the bar 24, the bars 25, set-screw 27', arm 26, rod 21 and the block 22 until one or other of the set screws strikes the angle 12, whereupon the pan will discharge its contents, being unable to tilt farther due to interception by the collar 28 of the arm 33. When the contents are discharged from the one pan, it is obvious that the other is filling and will overbalance, whereupon the above operation will be repeated upon the opposite side.

It is obvious, however, that the adjusting screws 27' perform both the function of governing the travel of the block 22 and the sweep of the arm 33, since with regard to the latter, no further movement can take place in the one direction when the end 34 of the arm 33 has come up against the collar 28 and the remoter set-screw has come into contact with the adjacent angle bar 12.

The movement of the block 22 will cause a quantity of chemical dust from the dispenser equal in volume to the stroke of the block times the area of the face thereof, to be discharged between the plate 18 and one of the plates 20 and deposited upon the upper surface of the baffle 49. This occurs immediately upon tilting of the rocking pan and the operation will have been completed before the grain has commenced to pass down the conducting chutes.

The seed now passes into the discharge hopper 43 and strikes the upper dust covered baffle with considerable velocity which scatters the dust to impregnate each grain seed therewith. Further mixing of the dust and grain is assured by subsequent baffles situated below the baffle 49. The treated grain is then discharged through the mouth of the spout 46.

It is highly important when treating grain that the correct proportions of dust to grain should be used and means are provided in the counterweight 41 and the collars 28 for making adjustment both of the amount of grain discharged from the pan in each tilting movement thereof and also in the grain thus discharged from the dispenser.

Moving the counterweight upwardly along the rod 40 will delay the time at which the pan will tilt, thereby permitting an increased quantity of grain to pour into either side of the pan. This counterweight also has to be adjusted when treating different grains, and when treating oats, for instance, the weight is moved downwardly a considerable distance below the point at which it is set when treating wheat. This is due to the considerable difference in the specific gravities of the two grain species.

In order that the correct amount of chemical dust may be used to correspond to the quantity of grain being discharged from the pan, the distance between the collars 28 may be adjusted in the manner already set forth.

In Figures 7 to 15, I have shown an alternative seed grain dusting structure embodying an alternative means for dispensing the dust and three different means for instantaneously stopping or checking the supply of grain from the hopper.

In this instance, my structure consists of four verticals 51 generally in the form of angle irons, these verticals being positioned and braced by transverse members 52, 53, and 54. Secured to the members 54, is my hopper 55 which is of substantially similar configuration to the hopper 6 already described and below the discharge mouth 56 thereof, is my tilting metering pan 57, my grain chute 58 between which is situated my dust container 59 while below the dust container and the chute is my mixing passage 60.

In this instance, my tilting pan is provided with brackets 61, one bracket being placed upon each half of the pan and upon one of the side walls thereof, a set screw 62 being provided upon each bracket for adjusting the degree of tilt required, the set screws being designed upon each pivotal movement to strike against the angle bar 63.

A pair of the angle bars 63 is provided, these being secured to the members 53, the angle bars being designed to support my dust container and chute, together with the pair of angle bars 64 which are secured to the members 52. The pivot shaft 65 upon which the pan 57 moves, is journalled in a pair of aligned apertures in the members 63, the base of the pan being provided with a pair of sleeves 66 through which set screws extend for the purpose of securing the same rigidly to the shaft.

At the outer end of the pivot shaft 65, I provide a pendulum assembly 67 upon which is a counterweight 68 adjustable for height thereupon and in this connection, it will be noted that in Figure 8 of the drawings accompanying this application, I have shown in phantom lines an over-balance assembly 69 in which the weight 70 is located above the pivot point of the tilting pan. My grain chute 58 extends downwardly from the angle bars 63 and consists of vertical side walls 71 and a pair of converging walls 72, the grain being designed to slide down the converging walls into the mixing passage upon precipitation from either side of the tilting metering pan.

Within the grain chute 58, I locate my dust container 59, this container occupying the width of the grain chute, the side walls thereof being the side walls 71 of the chute.

The floor 73 of the dust container is provided with a pair of apertures 74, these apertures being located upon either side of a central post 75 which extends through the centre of the floor and upwardly through the dust container to be secured in vertical position by means of a bracket 76 in which it is journalled, the bracket 76 spanning the side walls 71. Beneath the floor 73 is an adjustable flat bar 77, the same being upturned at its outer end as at 78 and provided with a tapped drilling. A bracket 79 is secured to one of the side walls 71, the bracket extending outwardly and over the portion 78, the same being cantilevered and provided at its free lower end with an adjustable set screw 80 which extends through the drilling in the portion 78. Thus by rotation of the set screw, an end shiftable movement takes place in the flat bar 77.

The flat bar 77 is provided with a central slot 81 in view of the fact that it is positioned centrally beneath the floor 73 and around the post 75 and upon either side of the slot 81 is an aperture 82 in vertical alignment with the apertures 74 in the floor 73. Beneath the flat bar 77 and pivoted on the post 75 for horizontal reciprocating movement, I provide an element 83, the same comprising a flat bar, one end of which is downturned as at 84, a bifurcated attachment 85 being attached to the downturned portion. Upon the links of the element, I provide two pairs of notches 86, each pair of notches being positioned in alignment on either edge of the flat bar and capable of coming into alignment with the apertures 82 as the element swings past the same therebeneath.

Secured to one of the side walls 71 for the purpose of retaining the elements 83 in horizontal position is a bracket 87 also consisting of a flat bar, the post 75 extending through an aperture therewithin. Upon the external end of the post and immediately below the bracket 87 is a washer 88 and upon the outer side of the washer is a compression spring 89 while at the lower end of the compression spring 89 is a second washer 90 which holds the spring 89 in slight compression due to the fact of its being held in position by means of a cotter pin 91.

From the foregoing arrangement, it will be seen that the bracket 87, the element 83 and the member 77 are all held tightly against each other and against the under side of the floor 73 as it will be understood that the bracket 87 is of thin material and is only secured at one end. This also applies to the member 77. It should be mentioned, however, that the post 75 is secured for rotation to and fro with the element 83 and secured to the post a short distance above the floor 73, I provide four radiating fingers 92 which extend in a horizontal direction across the dust container, thus keeping the dust within the container constantly agitated and as the member 83 reciprocates by means of the mechanism shortly to be described, it will be understood that a quantity of dust falls through the apertures 74 and the apertures 82 as the element 83 swings clear, being checked however when this member is passing immediately beneath the apertures 82 and I would here remark that the reason for the notches 86 is to effect a wider dispersion of the dust as it is scattered by the horizontal swing of the element 83.

The pendulum arm 93 of the pendulum assembly 87 extends between the prongs 94 of the member 85 and as the assembly and the member 93 swing with the metering pan as the grain falls first into one side and then into the other, it is obvious that the element 83 will swing in the manner described.

It will be noted that a wide V-shaped aperture 95 is formed upon one of the side walls 71 to allow for the movement of the element 83.

The grain now intimately mixed with dust travels downwardly to the mixing passage 60 spanning which are a number of baffles 96 and deflecting plates 97 of the cross sectional configuration clearly shown in Figure 7 of the drawings accompanying this application. Thus as the grain and dust tumble through this mixing passage an even more complete intermingling of the mercurial dust and grain takes place so that by the time the grain emerges at the bottom of the mixing passage, a very thorough dusting has taken place.

Figure 9:
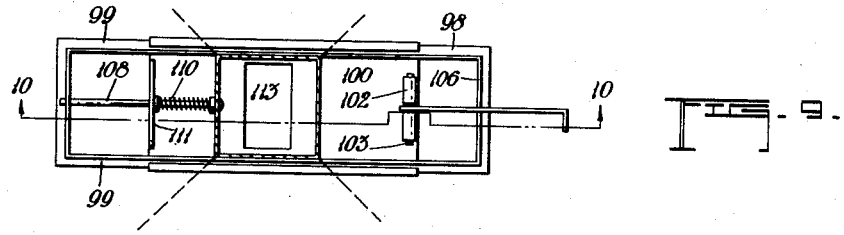
Fig. 9 is a plan view showing my instantaneous grain feed control.
Figures 10, 11:
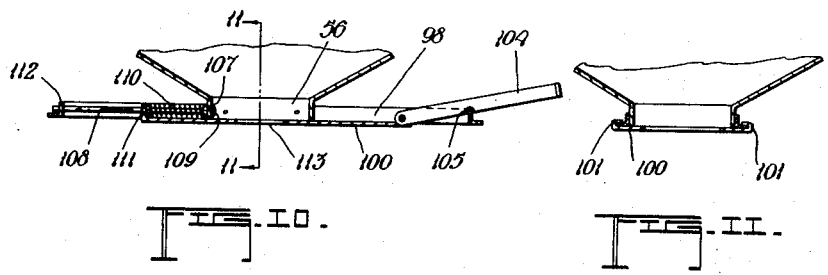
Fig. 10 is a sectional elevation on the line 10—10 of Figure 9.
Fig. 11 is a section on the line 11—11 of Figure 10.
Figures 14, 15:
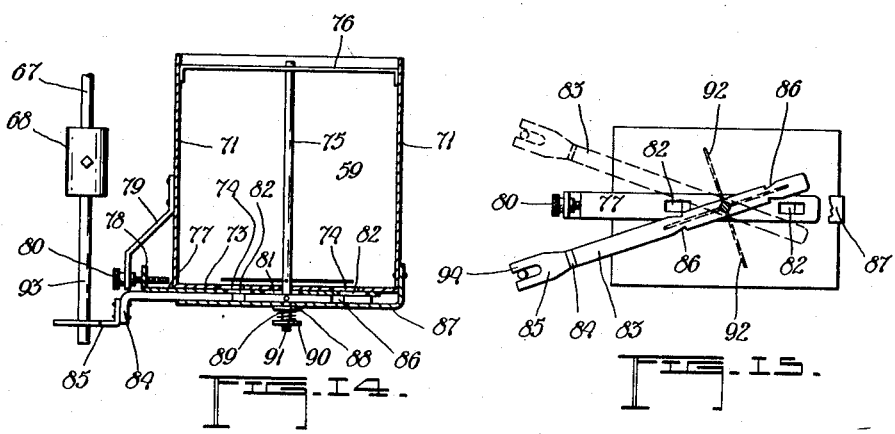
Fig. 14 is an elevational detail partly in section showing an alternative form of dust dispenser and associated mechanism, the same being taken upon the line 14—14 of Figure 7.
Fig. 15 is a plan view of the detail shown in Figure 14 from beneath.

Proceeding now to describe the various forms of grain feed controls illustrated in Figures 9 to 13 inclusive, Figures 9 to 11 illustrate the mechanism shown in Figure 7 of the drawings accompanying this application and in this case, it will be observed that secured to the exit aperture 56 of my hopper 55 is a frame 98 composed of angle iron, the side members 99 of this frame constituting a guide for a plate 100. This plate is provided with flanges 101 which engage with the members 99 and upon one end of the plate, I provide a pair of bearings 102 through which extend a short shaft 103. Secured at one end to the shaft 103 between the bearings 102 is a handle 104, this handle being provided with a notch 105 of which incidentally there may be a plurality if desired, the notch being designed to engage with the portion 106 of the frame 98.

Extending through the flange 107 which borders the exit aperture 56 of my hopper 55 is a finger 108, the end thereof being burred over as at 109 to prevent withdrawal from the flange 107. A coiled spring 110 surrounds the finger 108 for a portion of its distance, one end of the spring bearing against the outer surface of the flange 107 while the opposite end bears against the upturned end 111 of my plate 100. The finger then proceeds through an angle bar 112 which forms one side of my frame 98.

An aperture 113 is formed in my plate 100, the same being of smaller area than the exit aperture of the hopper and from the foregoing description, it will be seen that if grain is pouring through the hopper, one has only to lift the handle 104 so that the notch 105 disengages from the portion 106 whereupon the spring 110 will overcome its state of compression and will snap the plate 100 to the left to close the aperture 56 instantaneously.

Figures 12, 13:
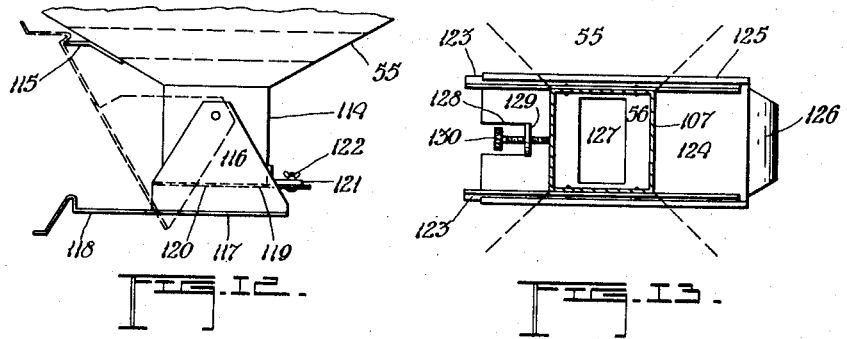
Fig. 12 is a side elevation of a second type of instantaneous grain feed control.
Fig. 13 is a plan view from beneath showing a still further method of providing an instantaneous control of the grain feed from my hopper.

In the embodiment illustrated in Figure 12, I provide a rectangular mouth 114 at the exit aperture of my hopper and to one side of one of the converging walls thereof, I provide a catch 115. Pivoted upon two of the opposite side walls of the mouth 114, I provide plates 116, there being one plate secured to each of the two walls.

Secured to the lower edge of each of the walls 16 and extending across the mouth 114 therebelow, I provide a check plate 117 and extending from the check plate is a handle 118 of spring metal, the end of which is of the configuration clearly shown in Figure 12 of the drawings accompanying this application. Thus, when the check plate is swung to one side as shown in phantom lines to permit the passage of grain through the mouth 114, the end portion of the handle will catch in the bracket 115 to maintain the assembly in this position.

In connection with this arrangement, I would also mention that immediately beneath the mouth 114, I provide a plate 119 in which is provided an aperture 120 of somewhat smaller area than the area of the mouth 114, this plate being slotted at one side and secured to the bracket 121 by means of a winged nut and bolt 122, the bolt extending through the slot. Thus the plate 119 may be moved to right or left for the purpose of centering the aperture therein immediately over the dust container 59.

In Figure 13, I have illustrated an instantaneous grain discharge cut-off arrangement in which a pair of angle guides 123 are secured to the opposite sides of the flange 107 surrounding the exit aperture of my hopper 55. A slidable plate 124, provided with beaded side edges 126 engages with the guides 123, one end of the plate 124 being provided with a curved portion 126 to facilitate manual adjustment thereof, an aperture 127 being provided upon the surface of the plate of somewhat smaller area than the exit aperture of my hopper.

The oposite end of the plate to that at which the portion 126 is located is cut out as at 128, the portion 129 between the cuts being downturned and provided with a tapped orifice through which extends a set screw 130, the end of the set screw is designed to bear against one side of the flange 107 and when it is desired to cut off the discharge of grain through the exit aperture of the hopper, the plate 124 is moved rapidly to the left with reference to Figure 13 for this purpose. To permit the discharge of grain to commence, the plate is moved rapidly to the right whereupon the aperture 127 will be automatically centered with respect to the exit aperture 56 so that grain will fall evenly first to one side and then to the other of the tilting metering pan 57.

It should be mentioned that in the embodiment of my grain duster illustrated in Figure 7, it will be noted that the two halves of the floor 131 and 132 incline upwardly towards the centre so that when the pan is tilted to the right as shown, the grain will first pile up slightly against the dividing wall 133 before overcoming the counterweight 68 and tilting the pan to the left.

I would finally revert to the dusting mechanism already described for the purpose of pointing out that by means of the set screw 80 and the sideways movable flat bar 77, the quantity of grain passing through the floor 73 of the dust container may be varied simply and at will.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. A machine for coating a quantity of seed grain with fine chemical dusts and particularly mercurial dusts during the passage of the said grain through the said machine, comprising in combination, a supporting structure, a seed grain hopper at the apex thereof having a discharge aperture at the base thereof, a pair of metering pans pivotally mounted for unitary tilting movement within said supporting structure, the said pans consisting of a pair of upstanding side walls, a floor extending therebetween, an upstanding centrally disposed partition extending across said floor and between said side walls to separate said pans, said floor upon either side of said partition inclining upwardly from the outer edge thereof towards the center, the said partition being of cuneiform cross-sectional configuration with the base thereof meeting said floor at either edge thereof, said pair of metering pans being positioned within said framework centrally below said hopper discharge aperture, grain from said aperture being precipitated into said pans alternately, a dust hopper provided with an outlet aperture, dust dispensing mechanism for metering the quantity of dust discharged through said aperture to mix with said grain during its discharge through said machine, the movement of said dust dispensing mechanism being synchronised with the movement of said pans.

2. A machine for coating a quantity of seed grain with fine chemical dusts and particularly mercurial dusts during the passage of the said grain through the said machine, comprising in combination, a supporting structure, a seed grain hopper at the apex thereof having a discharge aperture at the base thereof, a pair of metering pans pivotally mounted for unitary tilting movement within said supporting structure and centrally below said grain hopper, grain from said hopper being precipitated into each of said metering pans alternately, a pair of downwardly converging walls positioned within said supporting structure and below said metering pans, the lower horizontal edges of said walls being spaced apart to provide an aperture, grain being precipitated by said pans alternately through said aperture, a dust hopper provided with a dust outlet aperture positioned centrally below the point at which said metering pans are mounted centrally above said last mentioned aperture, and centrally above said converging walls and dust dispensing mechanism for metering the quantity of dust discharged through said dust outlet aperture to mix with said grain during its passage through said machine, said dust dispensing mechanism being actuated by the tilting movement of said metering pans.

HAROLD J. KEMP.